Patented Sept. 23, 1952

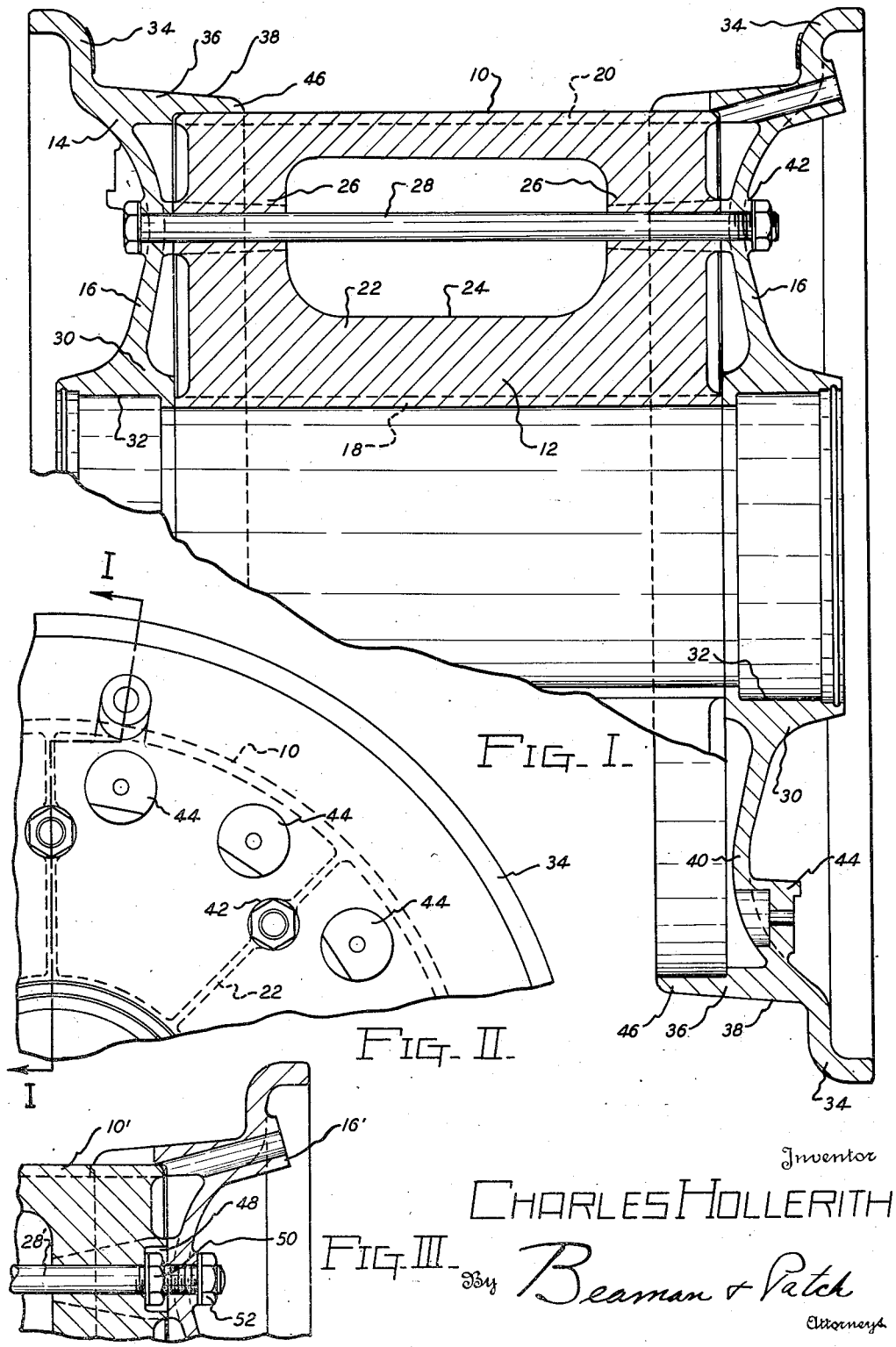

2,611,655

UNITED STATES PATENT OFFICE 2,611,655

WHEEL STRUCTURE

Charles Hollerith, Jackson, Mich., assignor, by mesne assignments, to The B. F. Goodrich Company, Akron, Ohio, a corporation of New York Application September 20, 1946, Serial No. 698,164

1 Claim. (Cl. 301—62)

The present invention relates to improvements in wheel construction having particular reference to a combination forged and cast wheel, being especially adapted to aircraft use.

One of the objects of the invention is to provide an improved combination forged and cast wheel construction.

Another object is to provide a wheel construction of the type described having an improved ratio of strength to weight by employing in the construction of the wheel both cast and forged component parts.

A still further object of the invention is to provide an improved aircraft wheel having a high ratio of strength to weight in which the tire retaining flange and outer side portions are forgings for taking radial and burst loads, with the central portion of the wheel of a cast construction with tie bolts holding the parts assembled through which the burst load upon the forged parts is taken.

Another object of the invention is to provide a combination forged and cast wheel in which the side sections, including the tire retaining flange, are of forged construction and are provided with flanges for supporting the tire bead and within which the central cast portion is piloted.

These and other objects and advantages residing in the construction, arrangement and combination of the several parts constituting the wheel construction will be more apparent from a consideration of the following specification and claim.

In the drawing,

Fig. I is a vertical cross-sectional view through a wheel structure embodying the present invention, taken on section I—I of Fig. II, Fig. II is a fragmentary end elevational view of the wheel shown in Fig. I, and Fig. III shows a modified form of tie bolt construction.

In the illustrated form of the invention, the wheel structure 10 comprises a cast central portion 12 and forged end or side sections 14 and 16. The central portion 12 is cast with relatively thin cylindrical wall portions 18 and 20 supported from each other by circumferentially spaced radial ribs 22 cored out at 24 to lighten the construction. The ribs 22 are cast with the boss portions 26 which are cored out and drilled to accommodate the tie bolts 28.

The forged end or side sections 14 and 16 on the wheel structure 10 may be identical, thus permitting both forgings to be fabricated from the same die. Each forging comprises a hub portion 30 having a recess 32 to receive the wheel bearings. The rim flange portion 34 forms a generally L-shaped section with the annular flange portion 36 defining a seat 38 for the bead of the pneumatic tire. Between the hub 30 and the flange 36 is a radial web 40 which may be relatively thin and is preferably of solid construction, except in the locality of the bosses 42 and 44 which are drilled out, one to receive the tie bolts 28 and the other to receive the fastening means for the brake drum (not shown). It will be understood, however, that the radial web 40 may be provided with openings to define open sections to further increase the lightness of the construction at the sacrifice of radial strength.

Annular portions 46 of the flange 36 are telescoped on the outer cylindrical portions 20 of the casting 10 to pilot one upon the other. As the wheel design herein disclosed is especially adapted for aircraft use, the central cast section 10 may be of cast magnesium with the forged sections 14 and 16 of forged magnesium. Obviously other cast or forged metals may be employed with corresponding results. Moreover, the central cast section 10 may be of one material and the forged sections 14 and 16 of a different material.

In Fig. 3 an arrangement is shown for facilitating the mounting of the tire upon the wheel structure. The central cast section 10' is provided with a recess 48 to provide clearance for the nut 50. The tie rod 28' has an extra long threaded portion. The outside nut 52 holds the forged section 16' in assembly. To mount the tire the nut 52 is removed to demount the section 16', the nut 48 functioning to hold the remaining component parts of the wheel assembled.

Having thus described my invention, what I claim as new and desire to cover by Letters Patent is:

A combination cast and forged wheel structure for supporting a pneumatic tire comprising a central cast section having outer cylindrical end rim portions and radially extending web portions connected with an inner cylindrical hub portion, one said web portion having an outwardly exposed recess therein, a forged end section for each said end rim portion, said end sections being formed to telescope over said end rim portions and having tire retaining flanges, and also having radially extending web portions joining inner hub portions, the thus overlapping end sections serving to strengthen the central cast section at the rim forming portion thereof, common axially extending tie rods extending between the radial web portions of said central section and the opposed radial web portions of the end sections and passing also through said central section, said tie rods having screw-threaded extremities passing through said recess on the one radial web of the central section, removable means constituting shoulder structure fixedly connected to said tie rod inwardly of the screw-threaded extremity of each said tie rod and located in said recess, whereby to hold the remote end section and the central cast section assembled by these rods and shoulder structures when the adjacent end section is demounted, and a further nut engageable with the outer end of the screw-threaded extremity of each said tie rod, whereby to hold the adjacent end section assembled, yet in a readily demountable manner.

CHARLES HOLLERITH.

REFERENCES CITED

The following references are of record in the file of this patent:

UNITED STATES PATENTS

| Number | Name | Date |
| --- | --- | --- |
| 1,052,129 | Carhart | Feb. 4, 1913 |
| 1,152,906 | Read | Sept. 7, 1915 |
| 1,861,432 | Barber | June 7, 1932 |
| 1,947,911 | Kay | Feb. 20, 1934 |
| 2,017,076 | Sauzedde | Oct. 15, 1935 |
| 2,020,667 | Wahl | Nov. 12, 1935 |
| 2,059,281 | Sauzedde | Nov. 3, 1936 |
| 2,124,773 | Frank | July 26, 1938 |
| 2,308,379 | Mercier | Jan. 12, 1943 |
| 2,317,610 | Hollerith | Apr. 27, 1943 |